Samuel H. Wallize's

Improved Fertilizer and Cornplanter Combined

71930

PATENTED
DEC 10 1867

Witnesses—
Moses Straus
A.C. Klick

Samuel H. Wallize,
Inventor
By his Atty—
S. F. Reigart

United States Patent Office.

SAMUEL H. WALLIZE, OF WASHINGTONVILLE, PENNSYLVANIA.

Letters Patent No. 71,930, dated December 10, 1867.

IMPROVEMENT IN FERTILIZER AND CORN-PLANTER COMBINED.

*The Schedule referred to in these Letters Patent and making part of the same.*

TO ALL WHOM IT MAY CONCERN:

Be it known that I, SAMUEL H. WALLIZE, of Washingtonville, Montour county, State of Pennsylvania, have invented an "Improved Fertilizer and Corn-Planter Combined;" and I do hereby declare the following to be an exact description thereof, reference being had to the accompanying drawings, and to the letters of reference marked thereon, making a part of this specification, in which—

Figure 1:
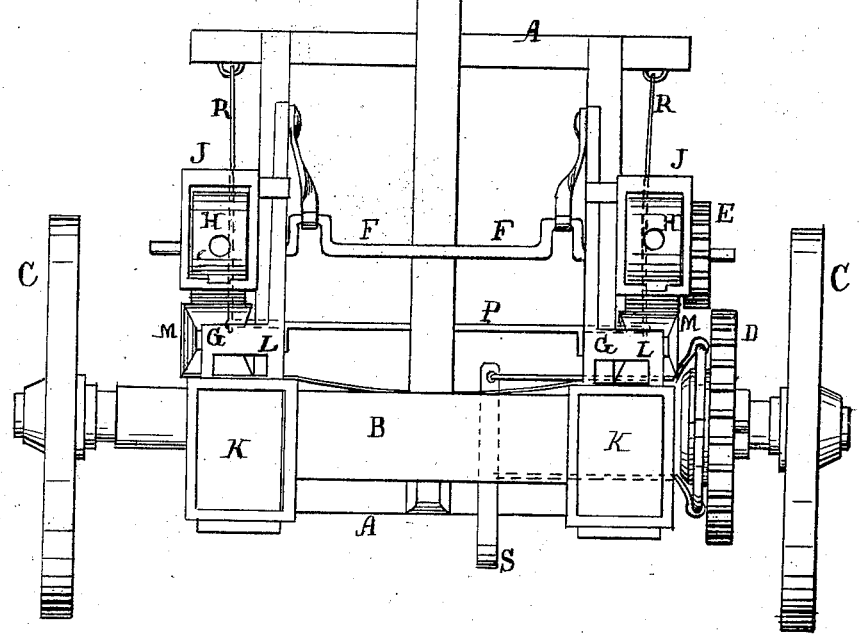

Figure 1 represents a top view.

Figure 2:
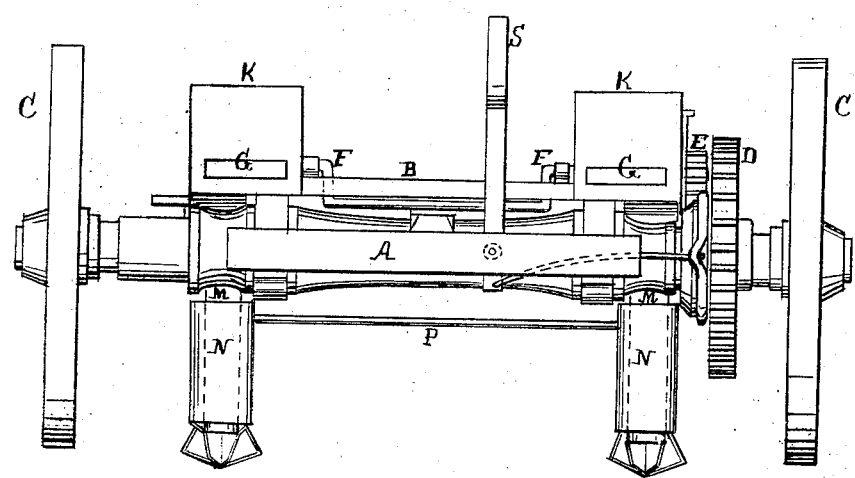

Figure 2, a rear view of the machine.

The nature of my invention consists in the arrangement and combination of the sowing-devices, discharging the guano and corn from the hopper through a single tooth down into the furrow, so as to avoid choking, as commonly caused by having to pass the guano through one tube and the corn through another. That invariably chokes up the boot or plough.

A represents the carriage-frame, with driver's seat B, carriage-wheels C C, one revolving independently on the axle, and the other with the axle that revolves the driving-wheel D, that gears into pinion-wheel E, that revolves the double crank F, that operates the slides G G, that are thus moved in connection with the seeding-rollers H H of the corn-hoppers J J and the guano-hoppers K K.

The guano, being first pulverized and put into the hoppers K K, the slides G draw out, by the apertures L L, a sufficient quantity of the guano to meet the grains of corn falling from the hoppers J J, when both fall together into the funnels M M, into the boots or teeth N N, and are properly and regularly sown together in the furrow without choking. The depth of furrow is regulated by the driver's feet pressing upon the cross-rod P connected to each boot N that is attached to a drag-bar, R, and the front of the frame A. The lever S is used by the driver to gear or ungear the machine, by moving it to either side.

What I claim as my invention, and desire to secure by Letters Patent, is—

The arrangement of the devices, slide G, and roller H, as connected and operating together, with the crank F, so as to drop the guano and corn through a single spout, to prevent choking, as herein described.

SAML. H. WALLIZE.

Witnesses:
J. FRANKLIN REIGART,
JOHN S. HOLLINGSHEAD.